United States Patent [19]

Kinoshita et al.

[11] Patent Number: 4,922,046
[45] Date of Patent: May 1, 1990

[54] LIQUID POLYMER COMPOSITION AND USE THEREOF

[75] Inventors: Tatsuo Kinoshita, Yamaguchi; Shuji Minami, Otake; Ryousuke Kaneshige, Ichihara, all of Japan

[73] Assignee: Mitsui Petrochemical Industries, Ltd., Tokyo, Japan

[21] Appl. No.: 178,055

[22] PCT Filed: Jul. 11, 1987

[86] PCT No.: PCT/JP87/00500
§ 371 Date: Mar. 10, 1988
§ 102(e) Date: Mar. 10, 1988

[87] PCT Pub. No.: WO88/00612
PCT Pub. Date: Jan. 28, 1988

[30] Foreign Application Priority Data

Jul. 11, 1986 [JP] Japan .................. 61-162013

[51] Int. Cl.$^5$ ................................ C10M 1/16
[52] U.S. Cl. ......................... 585/11; 252/73; 252/56 R; 252/56 S; 585/12; 585/13; 525/330.3
[58] Field of Search ............ 585/11, 12; 252/73, 252/56.5 R, 56.5 S

[56] References Cited

U.S. PATENT DOCUMENTS 3,790,358  2/1974  Rossi et al. ................... 585/11
3,910,856  10/1975  Kruku et al. .................. 585/12
4,194,057  3/1980  Brankling et al. ............... 585/11
4,620,048  10/1986  Ver Strate et al. .............. 585/11

FOREIGN PATENT DOCUMENTS

EP-A-
0119069  9/1984  European Pat. Off. .

*Primary Examiner*—Helane Myers
*Attorney, Agent, or Firm*—Armstrong, Nikaido Marmelstein, Kubovcik & Murray

[57] ABSTRACT

A liquid polymer composition contains:

(A) a liquid low molecular weight ethylene-α-olefin copolymer comprising 30 to 70 mol % of ethylene component units and 30 to 70 mol % of α-olefin component units, having a number average molecular weight ($\overline{Mn}$) in the range of 150 to 10000, with a Q-value (weight average molecular weight/number average molecular weight) of 3 or less, and (B) A high molecular weight polymer which is in an amount of 0.05 to 100 parts by weight based on 100 parts by weight of the liquid low molecular weight polymer (A), having a number average molecular weight ($\overline{Mn}$) of 20000 or higher, with a Q-value of 6 or less, and is soluble in the liquid low molecular weight polymer (A), which liquid polymer composition has an excellent viscosity characteristic, lubrication characteristic, and oxidation stability, without denaturation by moisture adsorption, and therefore, is suitable for use as an actuation oil.

12 Claims, No Drawings

LIQUID POLYMER COMPOSITION AND USE THEREOF

TECHNICAL FIELD

The present invention relates to a liquid polymer composition having an excellent lubrication characteristic, viscosity characteristic, and oxidation stability over a wide temperature range of from a low temperature to a high temperature, and an actuation oil composition comprising the liquid polymer composition. The term "actuation oil" used in this specification includes a brake fluid.

BACKGROUND ART

In the field of mechanical devices used, for example, in aircraft and automobiles, many actuation oils are used as the pressure transmission oils. Of these actuation oils, the actuation oils for use in aircraft and automobiles must have a low viscosity and small temperature dependency, as well as an excellent lubrication characteristic and excellent oxidation stability over a broad temperature range of from a low temperature to a high temperature.

In the prior art, as the actuation oil in the above fields, an extremely low viscosity silicone oil or low viscosity mineral oil is utilized, and primarily glycol ethers are used as brake fluids. However, although an extremely low viscosity silicone oil may have an excellent viscosity characteristic, the compression ratio thereof is high and the lubrication characteristic is unsatisfactory. Also, a low viscosity mineral oil does not have a satisfactory low temperature viscosity characteristic or oxidation stability, and glycol ethers not only have an unsatisfactory low temperature viscosity, but also have a lower boiling temperature caused by moisture absorption stemming from a high hygroscopic property. Accordingly, there is a strong demand for an actuation oil composition having an excellent viscosity characteristic, lubrication characteristic, and oxidation stability, and no denaturation caused by moisture absorption.

In the prior art, several proposals have been made concerning a synthetic lubricant oil comprising a liquid low molecular weight polymer. For example, Japanese Examined Patent Application (Kokoku) No. 47-21650 proposes the use of a copolymer distillate of an ethylene-propylene copolymer containing ethylene components at a specific ratio obtained by polymerization from which the low boiling distillate has been removed by non-destructive rectification or rectification after applying treatments such as cracking, hydrogenation, and dewaxing extraction. However, such a synthetic lubricant oil comprising a copolymer distillate is not a lubricant having an excellent balance of properties such as viscosity index, pour point, ignition point, shear stability, oxidation stability, thermal stability, oil film strength and further, even if the copolymer distillate can be utilized as an actuation oil, it cannot be utilized as an actuation oil having an excellent viscosity characteristic, lubrication characteristic, and oxidation stability over a broad temperature range.

Also, the present Applicant has proposed, in Japanese Unexamined Patent Application (Kokai) No. 57-117595, an ethylene-α-olefin copolymer synthetic lubricant oil containing 30 to 70 mol% of ethylene having a number average molecular weight of 300 to 2000, and a statistic molecular weight distribution with a Q-value (i.e., weight average molecular weight/number average molecular weight) of 3 or less. The ethylene-α-olefin copolymer according to this proposal has an excellent viscosity index, pour point, ignition point, shear stability, thermal stability, and oil film strength, and can exhibit an excellent performance when used as a synthetic lubricant. However, when this copolymer is utilized as an actuation oil, it is still unsatisfactory from the viewpoint of the viscosity characteristic over a broad temperature range.

Furthermore, Japanese Unexamined Patent Publication (Kokai) No. 48-65205, Japanese Unexamined Patent Publication (Kokai) No. 51-112809, and Japanese Examined Patent Publication (Kokoku) No. 47-42723 all propose lubricant oil compositions in which specific low crystalline ethylene-propylene copolymers are formulated as an viscosity index improver in lubricant oils. However, even if these lubricating oils are utilized as actuation oils, they do not have a satisfactory viscosity characteristic, lubrication characteristic and oxidation stability over a broad temperature range.

DISCLOSURE OF THE INVENTION

An object of the present invention, in view of the above-mentioned state of the prior art concerning the actuation oil as a pressure transmission medium for mechanical devices in such as aircraft and automobiles is to provide a liquid polymer composition having an excellent viscosity characteristic, lubrication characteristic and oxidation stability over a broad temperature range of from a low temperature to a high temperature and free from denaturation by moisture absorption.

In accordance with the present invention, there is provided a liquid polymer composition comprising:
(A) a liquid low molecular weight ethylene-α-olefin copolymer comprising 30 to 70 mol% of ethylene component units and 30 to 70 mol% of α-olefin component units, having a number average molecular weight ($\overline{Mn}$) in the range of 150 to 10000, with a Q-value (weight average molecular weight/number average molecular weight) of 3 or less, and
(B) a high molecular weight polymer which is in an amount of 0.05 to 100 parts by weight, based on 100 parts by weight of the liquid low molecular weight polymer (A), having a number average molecular weight ($\overline{Mn}$) of 20000 or higher, with a Q-value of 6 or less, and is soluble in the liquid low molecular weight polymer (A), as a first invention, and further an actuation oil composition comprising the liquid polymer composition, as a second invention.

DESCRIPTION OF THE EMBODIMENTS OF THE INVENTION

The liquid low molecular weight ethylene-α-olefin copolymer (A) to be formulated in the liquid polymer composition of the present invention is a transparent liquid low molecular weight ethylene-α-olefin copolymer comprising 30 to 70 mol% of ethylene component units, preferably ranging from 40 to 60 mol%, having a number average molecular weight ($\overline{Mn}$) as measured by gel permeation chromatography (GPC) in the range of 150 to 10000, preferably 150 to 5000, particularly preferably 150 to 2000, most preferably 200 to 1000, with a Q-value (i.e., weight average molecular weight/number average molecular weight) as measured by GPC of 3 or less, preferably 2.8 or less, particularly preferably 2.5 or less. The liquid low molecular weight ethylene-α-olefin copolymer within the above physical properties range has the advantage of an excellent oxidation stability and low temperature fluidity when formed into an actuation oil composition, by blending this copolymer with the high molecular weight polymer (B).

Also, the standard deviation value $\sigma$ of the ethylene composition of the above liquid low molecular weight ethylene-α-olefin copolymer is within the range of generally from 0 to 3, preferably from 0 to 2, particularly preferably from 0 to 1. The standard deviation value $\sigma$ of the ethylene composition of the liquid low molecular weight ethylene-α-olefin copolymer was determined by a solvent extraction of the above-mentioned copolymer using acetone/hexane solvent mixtures having different mixing rations, dividing the extract into five fractions with different compositions, determining the ethylene compositions of the ethylene-α-olefin copolymers of the respective fractions according to IR analysis, and calculating according to the following formula by using the ethylene compositions and the weight ratios of the respective fractions. A larger standard deviation value $\sigma$ indicates a broader composition distribution.

$$E = \sum_i E_i W_i / \sum W_i$$

$$\sigma = \sqrt{\sum_i (E_i - E)^2 W_i}$$

Wherein, $E_i$ represents the ethylene composition of the fraction i, $W_i$ represents the weight ratio of the fraction i, and $\overline{E}$ represents the average ethylene composition of the copolymer.

Examples of the α-olefin component unit which is the constituent of the above liquid low molecular weight ethylene-α-olefin copolymer are α-olefins having 3 to 20 carbon atoms such as propylene, 1-butene, 1-pentene, 1-hexene, 4-methyl-1-pentene, 3-methyl-1-pentene, 1-octene, -decene, 1-dodecene, 1-tetradecene, 1-hexadecene, 1-octadecene and the like, and this unit may be a mixed component of two or more kinds of these α-olefins.

The high molecular weight polymer (B) to be formulated in the liquid polymer composition of the present invention is a high molecular weight polymer soluble in the liquid low molecular weight polymer (A) having a number average molecular weight ($\overline{Mn}$) of 20000 or higher, preferably ranging from 40000 to 250000, with a Q-value (i.e., weight average molecular weight/number average molecular weight) of 6 or less, preferably 5 or less. The high molecular weight polymer within the above range of physical properties has the advantage that a good lubrication characteristics and oxidation stability can be obtained and a uniform actuation oil composition can be obtained, when blended with the copolymer (A) to form an actuation oil composition.

Specific examples of the high molecular weight polymer (B) are α-olefin polymers, conjugated diene-aromatic vinyl monomer copolymers or hydrogenated products thereof, (meth)acrylate type polymers. As the α-olefin polymer, homopolymers or copolymers of ethylene, propylene, 1-butene, isobutylene, 4-methyl-1-pentene, 1-hexene, 1-octene, 1-decene, etc., may be included. More specific examples are polyethylene, polypropylene, poly-1-butene, polyisobutylene, ethylene-propylene copolymer, ethylene-1-butene copolymer, ethylene-1-hexene copolymer, ethylene-1-decene copolymer, and ethylene-propylene-diene copolymer. As the conjugated diene-aromatic vinyl monomer copolymer or hydrogenated product thereof, styrene-butadiene block copolymers and hydrogenated products thereof and styrene-isoprenestyrene block copolymers and hydrogenated products thereof can be exemplified.

As the (meth)acrylate polymer, homopolymers or copolymers of acrylic acid esters and/or methacrylic acid esters having alkyl groups with 1 to 28 carbon atoms can be exemplified. Further, after polymerization of the above-mentioned (meth)acrylic acid esters, vinyl monomers such as styrene, α,β-unsaturated carboxilic acids or esters thereof may be also copolymerized in an amount of 50 parts by weight at the maximum.

The proportion of the soluble high molecular weight polymer (B) to be formulated in the liquid polymer composition of the present invention may be 0.05 to 100 parts by weight, preferably 0.05 to 50 parts by weight, particularly preferably 0.05 to 15 parts by weight, most preferably 0.1 to 10 parts by weight, based on 100 parts by weight of the liquid low molecular weight polymer (A).

Also, in the liquid polymer composition of the present invention, in addition to the liquid low molecular weight ethylene-α-olefin copolymer (A) and the soluble high molecular weight polymer (B), it is possible to formulate, if desired, a mineral oil (neutral oil), low molecular eight α-olefin polymer, silicone type synthetic lubricant oil, ester type synthetic lubricant oil, oxidation stabilizer, extreme-pressure agent, anti-rust additive, defoaming agent, abrasion preventive, and the like. The proportion of these components may be conveniently formulated as desired within a range which does not impair the effect of the liquid polymer composition of the present invention.

The composition of the present invention can be used for actuation oils (e.g., actuation oils for automobiles, aircraft), gear oils for automobiles, gear oils for industrial use, metal working oils, engine oils, lubricant oils, and the like.

EXAMPLES

In the following, the present invention will now be explained in detail by referring to Examples, but these Examples do not in any way limit the present invention. The EP-1 to EP-8 and EH-1 used in the following Examples were synthesized according to the method as described in Japanese Unexamined Patent Publication (Kokai) No. 57-123205 proposed by the present Applicant.

EXAMPLE 1

(Starting Polymers)

(A) Low Molecular Weight Copolymer, EP-1 $\overline{Mn}$ 380, ethylene 53 mol%, propylene 47 mol%, Q-value 1.2, $\sigma$ 0.1

(B) High Molecular Weight Polymer EP-2 $\overline{Mn}$ 50000, ethylene 60 mol%, propylene 40 mol%, Q-value 2.6

(Preparation of Composition)

The temperature of EP-1 was elevated to 100° C., and EP-2 was dissolved therein under stirring. The mixing ratio was 1.5 parts by weight, based on 100 parts by weight of EP-1.

Measurements of the solution as shown in Table 1 were conducted. The results are shown in Table 3.

TABLE 1

| Measurement Items | Unit | Measurement Conditions |
|---|---|---|
| Viscosity | cSt | 54.4 (°C.) JIS K 2283 |
|  | cPs | −40 (°C.) following JIS D 2983 |
| Viscosity index |  | JIS K 2283 |
| Load-Bearing Capability | kg/cm$^2$ | Sota four-ball test (200 rpm) following JIS k 2519 |
| Shear Stability | % | Sonication shear test following ASTM 2603 (10 kHz, 100 W - 30 min.) |

EXAMPLE 2

(Starting Polymers)

(A) Low Molecular Weight Copolymer, EP1: as described in Example 1.

(B) High Molecular Weight Polymer, PMA-1

Into a glass reactor having a 2-liter volume and equipped with a stirrer, a thermometer, a cooling pipe, and a nitrogen introducing inlet, were charged 500 g of a methacrylate with the composition shown in Table 2, 50 g of the above EP-1, and 4 g of azobiscyclo-hexanecarbonitrile and, after the reaction was internally replaced with nitrogen gas, polymerization was carried out with stirring at 110°0 C. for 10 hours. Further, 450 g of the above EP-1 was added under stirring. This solution is called PMA-1. As a result of an analysis of the polymer by gel permeation chromatography (GPC-1 Model A, produced by Shimazu Seisakusho), the number average molecular weight was found to be 50500, and the molecular weight distribution was 2.4.

TABLE 2

|  | Parts by weight |
|---|---|
| Number of Carbon Atoms in Alkyl Group 4 | 30 |
| Number of Carbon Atoms in Alkyl Group 12 | 20 |
| Number of Carbon Atoms in Alkyl Group 14 | 25 |
| Number of Carbon Atoms in Alkyl Group 16 | 15 |
| Number of Carbon Atoms in Alkyl Group 18 | 10 |

Next, the temperature of EP-1 was elevated to 100° C. and PMA-1 was mixed therewith while stirring. The mixing ratio was 10 parts by weight of PMA-1 based on 100 parts by weight of EP-1. The same measurements of this solution as in Example 1 were carried out. The results are shown in Table 3.

EXAMPLE 3

(Starting Polymers)

(A) Low Molecular Weight Copolymer, EH-1 $\overline{Mn}$ 430, ethylene 50 mol%, 1-hexene 50 mol%, Q-value 1.3, $\sigma$ 0.2

(B) High Molecular Weight Polymer, PMA-1: as used in Example 2.

(Preparation of Composition)

In Example 2, EHR-1 was used instead of EP-1, but otherwise the same procedure as in Example 3 was carried out. The results are shown in Table 3.

EXAMPLE 4

(Starting Polymers)

(A) Low Molecular Weight Polymer, EP-3 $\overline{Mn}$ 410, ethylene 44 mol%, propylene 56 mol%, Q-value 1.2, $\sigma$ 0.1

(B) High Molecular Weight Polymer, PMA-2

A polymerization of 65% by weight of methacrylate comprising 10% by weight of methacrylate with an alkyl group having 14 carbon atoms, 60% by weight of methacrylate of 16 carbon atoms, and 30% by weight of methacrylate of 18 carbon atoms was carried out with EP-1 as the solvent. This EP-1 solution is called PMA-2. The polymer had an $\overline{Mn}$ of 60000 and a molecular weight distribution of 2.2.

(Preparation of Composition)

Next, EP-3 and PMA-2 were mixed while stirring. The mixing proportion was 10 parts by weight of PMA-2 based on 100 parts by weight of EP-3. The same measurements of this solution were carried out as in Example 1. The results are shown in Table 3.

EXAMPLE 5

(Starting Polymers)

(A) Low Molecular Weight Copolymer, EP-4 $\overline{Mn}$ 670, ethylene 49 mol%, propylene 51 mol%, Q-value 1.3, $\sigma$ 0.1

(B) High Molecular Weight Polymer, PMA-1 as used in Example 2.

(Preparation of Composition)

In Example 2, EP-4 was used instead of EP-1, but otherwise the same procedure as in Example 2 was carried out. The results are shown in Table 3.

EXAMPLE 6

For the actuation oil composition in Example 2, the performances thereof as an actuation oil were examined according to the MIL-H-5606 (HYDRAULIC FLUID, PETROLEUM BASE; AIRCRAFT, MISSILE, AND ORDNANCE) standard (the test method shown in Table 4). The results are shown in Table 5.

EXAMPLE 7

The actuation composition was prepared in the same manner as in Example 2 except that EP-9 ($\overline{Mn}$ 250, ethylene composition 49 mol%, propylene composition 51 mol%, Q-value 1.1, $\sigma=0.1$) was used instead of EP-1, and changing the amount of PMA-1 mixed to 6.5 parts by weight based on 100 parts by weight of EP-9, and the performances as an actuation oil were examined according to the MIL-H-81019D (HYDRAULIC FLUID, PETROLEUM BASE, ULTRA-LOW TEMPERATURE, METRIC) standard.

EXAMPLE 8

The performance of the composition of Example 5 as the brake fluid were examined according to ISO 7309-1985(E) (Road vehicles-Hydraulic braking systems-ISO reference petroleum base fluid) standard. The results are shown in Table 7.

COMPARATIVE EXAMPLE 1

(Starting Polymers)

(A) Low Molecular Weight Copolymer, EP-5 $\overline{Mn}$ 120, ethylene 50 mol%, propylene 50 mol%, Q-value 1.1, $\sigma$ 0.1

(B) High Molecular Weight Polymer, PMA-1 as used in Example 2.

(Preparation of Composition)

As in Example 2, EP-5 and PMA-1 were mixed while stirring. The mixing proportion was 10 parts by weight of PMA-1 based on 100 parts by weight of EP-5. The same measurements of this fluid as in Example 1 were carried out. The results are shown in Table 3.

COMPARATIVE EXAMPLE 2

(Starting Polymers)

(A) Low Molecular Weight Copolymer, EP-6 $\overline{Mn}$ 3200, ethylene 52 mol%, propylene 48 mol%, Q-value 2.4, $\sigma$ 0.2

(B) High Molecular Weight Polymer, PMA-1 as used in Example 2

(Preparation of Composition)

As in Example 1, the temperature of EP-6 was elevated to 100° C. and mixed while stirring with PMA-1. The mixing proportion was 10 parts by weight of PMA-1 based on 100 parts by weight of EP-6. The same measurements of this fluid as in Example 1 were carried out. The results are shown in Table 3.

COMPARATIVE EXAMPLE 3

(Starting Polymers)

(A) Low Molecular Weight copolymer, EP-7 $\overline{Mn}$ 810, ethylene 10 mol%, propylene 90 mol%, Q-value 1.6, $\alpha$ 0.2

(B) High Molecular Weight Polymer, PMA-1 as used in Example 2

(Preparation of Composition)

Comparative Example 2 was repeated except that EP-7 was used instead of the EP-6 used in Comparative Example 2. The results are shown in Table 3.

COMPARATIVE EXAMPLE 4

(Starting Polymers)

(A) Low Molecular Weight Copolymer, EP-8 $\overline{Mn}$ 400, ethylene 81 mol%, propylene 19 mol%, Q-value 1.4, $\sigma$ 0.3

(B) High Molecular Weight Polymer, PMA-1 as used in Example 2

(Preparation of Composition)

Comparative Example 2 was repeated except that EP-8 was used instead of the EP-6 used in Comparative Example 2. The results are shown in Table 3.

COMPARATIVE EXAMPLE 5

The actuation oil characteristics of a commercially available silicone oil (SH-200, produced by Toray Silicone Co.), were measured. The results are shown in Table 3.

COMPARATIVE EXAMPLE 6

The actuation oil characteristics of a commercially available mineral oil (Hydrofluric Oil SV produced by Fuji Kosan Co.), were measured. The results are shown in Table 3.

TABLE 3

| Quality performance items | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Viscosity cSt 54.4° C. | 12.5 | 10.2 | 10.5 | 11.0 | 25 | 3.0 | >10⁴ | 2000 | >10⁶ | 15 | 25 |
| Viscosity cPs −40° C. | 1000 | 400 | 600 | 800 | 1000 | 30 | >10⁶ | >10⁶ | — | 150 | >10⁵ |
| Viscosity index | 230 | 465 | 415 | 390 | 300 | 750 | 400 | 200 | — | 500 | 120 |
| Load bearing ability kg/cm² (four-ball test 200 rpm) | 3.5 | 3.5 | 4.0 | 4.0 | 5.0 | 2.0 | — | 4.5 | — | 1.5 | 4.0 |
| Shear stability Viscosity lowering (10 kHz 100 W-30 min.) | 15 | 21 | 24 | 20 | 15 | 25 | — | 20 | — | 0 | 0 |

Note: Viscosity values with exponents should be read as $>10^4$, $>10^6$, $>10^5$ respectively.

TABLE 4

| Test items | Test methods ASTM No. |
|---|---|
| Viscosity | D445 |
| Pour Point | D97 |
| Ignition point | D93 |
| Acid value | D664 |
| Weight reduction by heating vaporization | D972 (note 1) |
| Water content | D1744 |

(note 1) conducted under the conditions of 71° C., 6 hr

TABLE 5

Results of Example 2 actuation oil for MIL-H-5606E

| Property items | Standard | Results |
|---|---|---|
| Viscosity (cSt 100° C.) | 4.90 or more | 5.71 cSt |
| Viscosity (cSt 40° C.) | 13.2 or more | 13.3 cSt |
| Viscosity (cSt −40° C.) | 600 or less | 400 cSt |
| Viscosity (cSt −54° C.) | 2500 or less | 1800 cSt |
| Pour point | −60° C. or less | −65° C. or less |
| Ignition point | 82° C. or less | 120 |
| Acid value Note (1) | 0.20 or less | 0.01 or less |
| Weight reduction by heating vaporization (%) | 20 or less | 8 |
| Water content (ppm) | 100 or less | 30 |

Note (1) reduction after 71° C. × 6 hr
(Sample weight before heating-Sample weight after heating)/Sample weight before heating

TABLE 6

Results of Example 7 actuation oil for MIL-H-81019D

| Property items | Standard | Results |
|---|---|---|
| Viscosity (m²/s) | | |
| 100° C. | $2.5 \times 10^{-6}$ or more | $2.6 \times 10^{-6}$ |
| −54° C. | $800 \times 10^{-6}$ or less | $190 \times 10^{-6}$ |

TABLE 6-continued

Results of Example 7 actuation oil for MIL-H-81019D

| Property items | Standard | Results |
|---|---|---|
| −70° C. | 0.008 or less | 0.0012 |
| Pour point (°C.) | −75 or less | −78 or less |
| Ignition point (°C.) | 95 or more | 120 |
| Combustion point (°C.) | 110 or more | 138 |
| Neutralization value | 0.2 or less | 0.01 or less |
| Weight reduction by heating vaporization (wt %. 70° C. ± 1° C. 6 hr) | 12 or less | 9 |
| Water content (ppm) | 200 | 30 |

TABLE 7

Results of Example 5 composition for ISO-7309

| Properties | Unit | Test method | Value | Example 5 | Commercially available mineral oil type brake oil |
|---|---|---|---|---|---|
| Dynamic viscosity (100° C.) | mm²/s | ISO 3104 | >6 | 10.5 | 6.65 |
| Dynamic viscosity (−40° C.) | mm²/s | ISO 3104 | <2000 | 1000 | 1800 |
| Pour point | °C. | ISO 3016 | <−50 | −55 | — |
| Ignition point | °C. | ISP 2592 | >105 | 240 | 105 |
| Initial distilling point | °C. | ISO 3405 | >240 | 285 | 245 |
| Neutralization value | mg KOH/g | ISO 6618 | <0.2 | 0.01 or less | — |
| Phosphorus | ppm | Fluorescent X-ray (XFR) | 800 ± 80 | not detected | — |

EXAMPLE 9

(Starting Polymers)

(A) Low Molecular Weight Copolymer EP-10 $\overline{Mn}$ 3810, ethylene 54 mol%, propylene 46 mol%, Q-value 1.2, σ 0.1

(B) High Molecular Weight Polymer, PMA-1 as used in Example 2

(C) Low Molecular Weight α-Olefin Polymer PAO-1 GULF OIL CHEMICALS COMPANY/GULF SYNFLUID ® BASE FLUID 4cSt (Preparation of Composition)

In Example 2, a mixture of EP-10/PAO-1=50/50 (wt/wt) was used instead of EP-1 and 0.3 parts of PMA-1 were used, based on 100 parts by weight of the EP-10/PAO-1 mixture, but otherwise the same procedure was followed.

The physical properties of the composition were a dynamic viscosity of 98.0 cSt at 100° C., a dynamic viscosity of 880 cSt at 40° C., a viscosity index of 205, and a pour point of −40° C.

COMPARATIVE EXAMPLE 7

When the physical properties of a commercially available gear oil composition for industrial use (Bonknock SP3800, produced by Nippon Petroleum K.K.) were measured, the respective properties were found to be a dynamic viscosity of 99.5 cSt at 100° C., and 3620 cSt at 40° C., a viscosity index of 87, and a pour point of +2.5° C.

We claim:

1. A liquid polymer composition comprising:

(A) a liquid low molecular weight ethylene-α-olefin copolymer comprising 30 to 70 mol% of ethylene component units and 30 to 70 mol% of α-olefin component units, having a number average molecular weight ($\overline{Mn}$) in the range of 150 to 5,000, with a Q-value (i.e., weight average molecular weight/number average molecular weight) of 3 or less, and (B) a high molecular weight polymer which is in an amount of 0.05 to 100 parts by weight based on 100 parts by weight of the liquid low molecular weight polymer (A), having a number average molecular weight ($\overline{Mn}$) of 20000 or higher, with a Q-value of 6 or less, and is soluble in the liquid low molecular weight polymer (A).

2. A composition as claimed in claim 1, wherein the content of ethylene component in the liquid low molecular weight ethylene-α-olefin copolymer is 40 to 60 mol%, and the number average molecular weight of the copolymer is 150 to 2000, and Q-value is 2.8 or less.

3. A composition as claimed in claim 1, wherein the α-olefin has 3 to 20 carbon atoms.

4. A composition as claimed in claim 1, wherein the high molecular weight polymer (B) is an α-olefin polymer, a conjugated diene-aromatic vinyl monomer copolymer or hydrogenated product thereof or (meth)acrylate copolymer.

5. A composition as claimed in claim 1, wherein the proportion of the high molecular weight polymer (B) is 0.05 to 15 parts by weight, based on 100 parts by weight of the liquid polymer (A).

6. An actuation oil comprising a liquid polymer composition comprising:

(A) a liquid low molecular weight ethylene-α-olefin copolymer comprising 30 to 70 mol% of ethylene component units and 30 to 70 mol% of α-olefin component units, having a number average molecular weight ($\overline{Mn}$) in the range of 150 to 5,000, with a Q-value (weight average molecular weight/number average molecular weight) of 3 or less, and (B) a high molecular weight polymer which is in an amount of 0.05 to 100 parts by weight, based on 100 parts by weight of the liquid low molecular weight polymer (A), having a number average molecular weight ($\overline{Mn}$) of 20000 or higher, with a Q-value of 6 or less, and is soluble in the liquid low molecular weight polymer (A).

7. An actuation oil as claimed in claim 6, wherein the content of ethylene component in the liquid low molecular weight ethylene-α-olefin copolymer is 40 to 60 mol%, and the number average molecular weight of the copolymer is 150 to 2000, and Q-value is 2.8 or less.

8. An actuation oil as claimed in claim 6, wherein the α-olefin has 3 to 20 carbon atoms.

9. An actuation oil as claimed in claim 6, wherein the high molecular weight polymer (B) is an α-olefin polymer, a conjugated diene-aromatic vinyl monomer copolymer or hydrogenated product thereof or (meth)acrylate copolymer.

10. An actuation oil as claimed in claim 6, wherein the proportion of the high molecular weight polymer (B) is 0.05 to 15 parts by weight, based on 100 parts by weight of the liquid polymer (A).

11. A composition as claimed in claim 1, wherein the proportion of the high molecular weight polymer (B) is 0.05 to 15 parts by weight, based on 100 parts by weight of the liquid polymer (A).

12. An actuation oil as claimed in claim 6, wherein the proportion of the high molecular weight polymer (B) is 0.05 to 15 parts by weight, based on 100 parts by weight of the liquid polymer (A).

* * * * *